United States Patent [19]

Goldman

[11] Patent Number: 4,795,890
[45] Date of Patent: Jan. 3, 1989

[54] DEVICE AUTHENTICATION SYSTEM FOR ON AND OFF LINE USE

[75] Inventor: Robert N. Goldman, Honolulu, Hi.

[73] Assignee: Light Signatures, Inc., Los Angeles, Calif.

[21] Appl. No.: 9,867

[22] Filed: Feb. 2, 1987

[51] Int. Cl.[4] .................................................. G06K 5/00
[52] U.S. Cl. ...................................... 235/380; 235/449; 340/825.33
[58] Field of Search .................... 235/380, 440, 449; 340/825.33

[56] References Cited

U.S. PATENT DOCUMENTS

| 4,114,027 | 9/1978 | Slater et al. | 340/825.33 X |
| 4,450,348 | 5/1984 | Stockburger et al. | 235/380 |
| 4,476,468 | 10/1984 | Goldman | 235/380 X |
| 4,568,936 | 2/1986 | Goldman | 235/380 |
| 4,752,676 | 6/1988 | Leonard et al. | 235/449 X |

Primary Examiner—David L. Trafton
Attorney, Agent, or Firm—Nilsson, Robbins, Dalgarn, Berliner, Carson & Wurst

[57] ABSTRACT

A verification system for cards or other devices with an anticounterfeit characteristic and an escort memory, wherein for lower or routine levels of security, the escort memory serves to confirm part of the anticounterfeit characteristic and for higher levels of security a central station memory is employed to confirm another part of the anticounterfeit characteristic. Distinction between levels of security is determined on the basis of time or other criteria imposed from the central station.

11 Claims, 2 Drawing Sheets

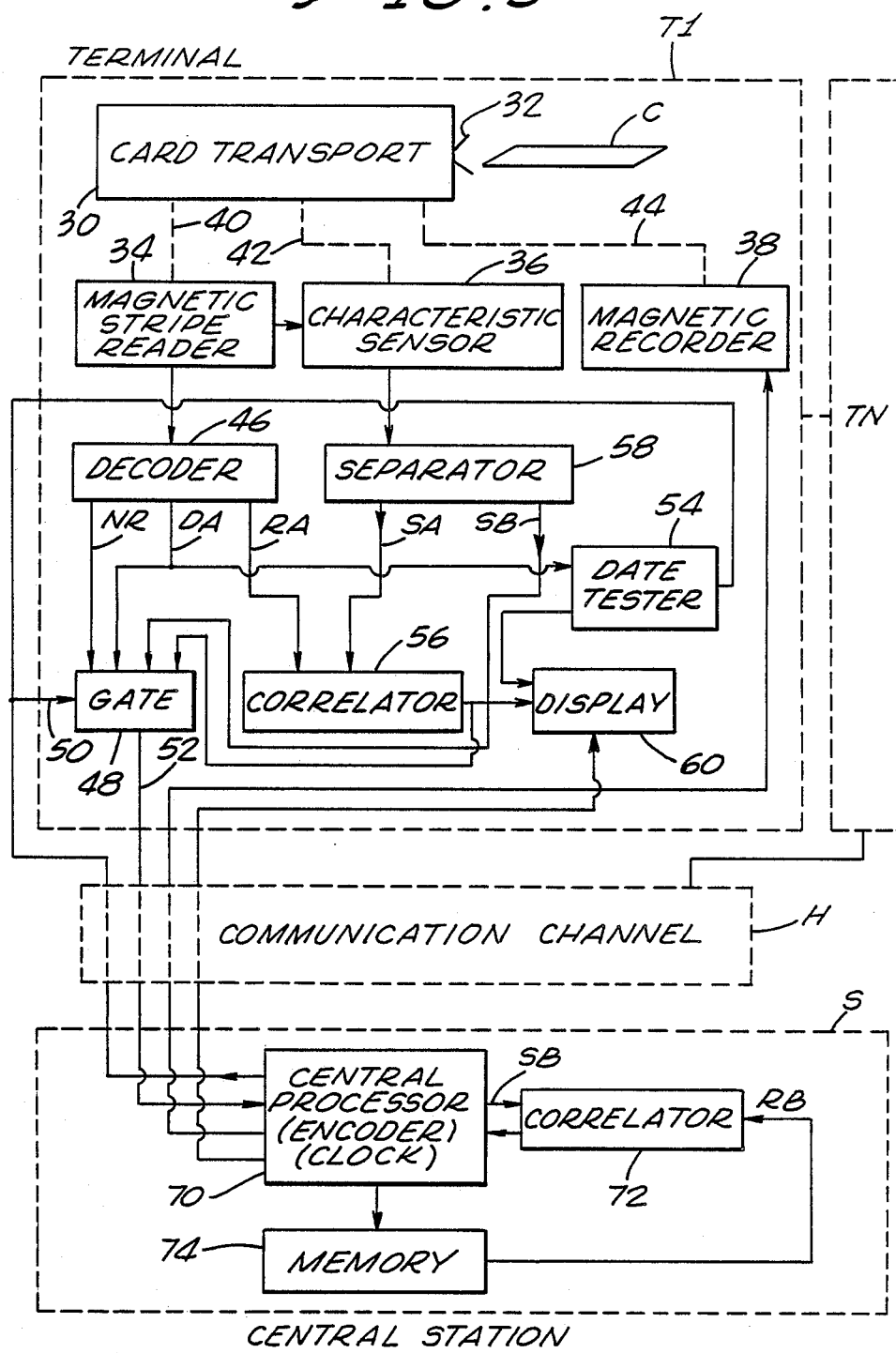

DEVICE AUTHENTICATION SYSTEM FOR ON AND OFF LINE USE

BACKGROUND AND SUMMARY OF THE INVENTION

The extensive use of various identification devices to support a wide variety of commercial transactions has reached phenomenal proportions. Typically in the form of plastic cards, these transaction devices have substantially replaced cash in many fields of commerce. The transaction devices, in the form for example of credit or debit cards, usually are issued to an assigned person by an organization for use during a limited period of time and with certain other limitations. While convenience and certain other advantages are apparent for such cards, persistent disadvantages accompany their use.

Perhaps one of the greatest problems attendant the widespread use of transaction cards in various forms involves their unauthorized use, specifically with regard to devices that have been lost, stolen or counterfeited. Efforts to control the proper use of such devices while restricting illicit authorizations, have involved various systems and techniques. For example, transaction cards have been issued with a limited life. That is, imposing a limited effective lifetime on a card invokes an ultimate safeguard against misuse of the card.

Generally, the shorter the effective life of a card, the less susceptible the card is to misuse. However, periodically issuing fresh cards is complex and expensive. Furthermore, the production and delivery of cards involves considerable exposure. That is, during production and distribution, transaction cards are particularly vulnerable to loss and theft. Consequently, a need exists for an improved system to impose ultimate safeguards on transaction cards and similar devices without the complications and expense of replacing existing devices.

In the past, various techniques and mechanisms have been employed to authenticate or verify transaction cards as a condition to their use. According to one technique, data on each car is maintained at a central location and is consulted before allowing the card to be used. Normally the technique involves extensive communication facilities along with data processing apparatus. The technique is generally referred to as "on-line" authentication.

As an alternative or supplement to on-line authentication, various techniques have been employed to verify that a card is genuine and is being presented by its assigned holder. For example, anticounterfeiting techniques have involved utilizing unique or difficult characteristics of a card which characteristics can be sensed to verify the authenticity of the card. Private personal identification data also has been used along with coding techniques to verify the holder of hhe card. When such techniques serve as the sole basis of verifying a card (without on-line checking) the verification is generally called "off-line" authorization. Accordingly, when a card is authorized for use to support a transaction without reference to a central file, the authentication is off-line and when reference is made to such a file, the authorization is termed on-line. Generally, off-line authentication at any of a multitude of transaction terminals is usually faster and cheaper but less reliable than on-line authorization.

It has been previously proposed to operate systems in both on-line and off-line modes. For example, in an on-line system, any of a multitude of individual terminals may function in an off-line mode in the event of a failure in the external communication system or at the central station. Other composite systems have employed system activity and transaction values as criteria for alternatively utilizing on-line and off-line modes of operation.

Generally, the system of the present invention affords relatively reliable off-line authentication during a controlled period of time. Thereafter, an on-line verification is required to refresh the card for another period of off-line use. In accordance with the present invention, off-line use of the card is controlled by verifying some anticounterfeit data characteristic of the card encoded with identification data, while on-line verification involves central-station verification of different anticounterfeit data that is highly obscure in the card.

Implementations of systems of the present invention may involve a variety of different applications comprising on-line or both on-line and off-line terminals. The necessity for an on-line authentication may be based on different criteria, for example, time or the significance of a transaction being approved may govern. In an exemplary application, a card may be issued with no expiration date except that an occasional on-line validation is required to maintain its effective life. In another alternative application of the system, a card may be issued to support routine transactions with off-line authentication, however, an on-line authentication is required to support exceptional transactions. Accordingly, the system hereof affords economy in a variety of relatively secure applications along with the possibility of reducing the cost and danger of frequently reissuing cards.

As another specific exemplary application of the present invention, alien identification cards may be validated normally by off-line operation as, for example, at isolated border locations. However, periodically a thorough check of a card's subject may be required at a location having on-line capability.

As still another example, an entry card for an extensive military installation involving classified areas of different security levels may be used for entry at lower levels with off-line validation but requiring on-line verification for use at higher levels. Of course, various other applications, including many related to commercial transactions will be readily apparent in view of the disclosed embodiment.

BRIEF DESCRIPTION OF THE DRAWINGS

In the drawings, which constitute a part of this specification, an exemplary embodiment of the invention is set forth as follows:

FIG. 3 is a block diagram of a system constructed in accordance with the present invention.

DESCRIPTION OF THE ILLUSTRATIVE EMBODIMENT

As indicated above, a detailed illustrative embodiment of the present invention is disclosed herein. However, physical identification media, data formats and operating systems structured in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
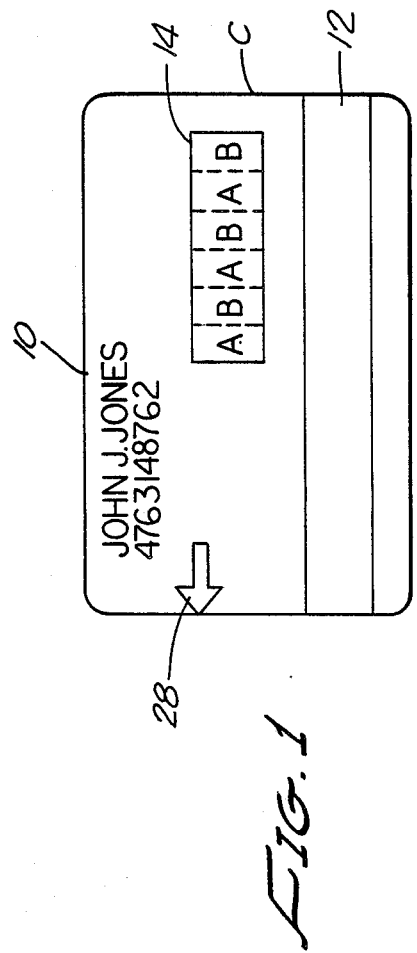
FIG. 1 is a plan view of a card constructed for use in the disclosed embodiment of the present invention.

Referring initially to FIG. 1, a transaction device is illustrated in the exemplary form of a credit card C. The card C carries indicia 10 indicating the name and account number of the assigned holder. Also, a magnetic stripe 12 is integrated in the card C in accordance with common practice. Additionally, the card C has an anticounterfeit or uniqueness characteristic area 14 which, somewhat like a fingerprint, identifies the card C.

The card C may take various structural forms, as for example, a flat form incorporating a sheet of bond paper to provide a translucency pattern as a uniqueness characteristic. Such a form is disclosed in U.S. Pat. No. 4,423,415 issued Dec. 27, 1983 to R. N. Goldman. In another exemplary form, the card C may comprise a composition wherein the area 14 modulates light with regard to orientation or frequency properties as disclosed in U.S. Pat. No. 4,476,468 issued Oct. 9, 1984 to R. N. Goldman.

The anticounterfeit area 14 is illustrated to be divided into alternate bands or segments A and B. Physically, no such division exists; however, as disclosed in detail below, data representative of the different segments A and B is separated and processed in distinctly different operations. Generally, data sensed from the segments A is verified by comparison with reference data from the magnetic stripe 12. Accordingly, one level of authentication is accomplished. At a second level of authentication, data sensed from the segments B is compared with reference data stored at an on-line central station facility. Accordingly, a different level of authentication is performed.

In the illustrative embodiment, as disclosed in detail below, the data from the segments A is coded with time-related data and recorded on the magnetic stripe 12 of the card C. The time-related data is used to regulate and limit off-line authentication of the card C as disclosed in detail below. The stripe 12 also records the account number of the assigned card holder and may carry additional information as, for example, a personal identification number for the card holder, or other daa as employed to control and regulate the use of the card.

Considering the content of the magnetic stripe 12 n greater detail, reference will now be made to FIG. 2. The magnetic stripe 12 is fragmentarily represented to show the data of instant concern. Segments define the individual data packages. Specifically, a segment 20 records the account number for the card, coinciding to the number revealed by the indicia 10 (FIG. 1).

A data segment 22 (FIG. 2) designates specific locations (pixels) within the segments A and B from which characteristic data is selected for identification. In that regard, each of the segments A and B (FIG. 1) are dissected into a multitude of pixels and only data from select pixels is employed for identification. Thus, the pixels of select data are specified by the contents of segment 22 (FIG. 2) of the magstripe 12. Accoddingly, individual pixels are defined for both the segments A and B, which supply the identification characteristic data.

A segment 24 (FIG. 2) of the magstripe 12 records encoded signals representative of combined data, specifically the reference characteristic data for select pixels of the segments A (FIG. 1) and data on the date of last on-line approval of the card C. That is, the segment 24 (FIG. 2) records previously sensed reference values of pixel data A encoded along with time information, both being used during the authentication process.

Segment 26 (FIG. 2) of the stripe 12 records miscellaneous other data. Personal identification data, value-frequency use history data, holder rating and various other forms of information on the holder or the card might be included.

The card C may be produced using a wide variety of different materials, techniques and manufacturing processes. As indicated above, the anticounterfeit or uniqueness area 14 may take a variety of different forms, exemplary structures being well known in the prior art. In the illustrative embodiment, the card C incorporates layer or sheet of bond paper which affords the uniqueness characteristic as explained and described in the above-referenced U.S. Pat. No. 4,423,415. Specifically, a sheet of bond paper is sandwiched between plastic layers that are clear to the extent of providing the area 14 substantially transparent except for the opaque medium of the bond paper. The opacity pattern of the area 14 thus constitutes the anticounterfeit or uniqueness characteristic and is defined as explained above, first into sector A and B and second into individual pixels.

The magnetic stripe 12 is incorporated in the card C in accordance with techniques as well known and widely practiced in the prior art. Similarly, the indicia 10 along with an arrow 28 is provided on the card C using any of a variety of well known techniques.

To complete the card C from a raw form as illustrated in FIG. 1 and explained above, the anticounterfeit characteristic area 14 is sensed to provide characteristic reference data from select pixel locations. The pixel data is then encoded and recorded on the magnetic stripe 12 to be used at a later time as reference data. The operation of sensing and selecting the pixel data may be performed substantially as disclosed in the above-referenced U.S. Pat. No. 4,423,415.

The data specifying the select pixel locations is recorded on the magnetic stripe 12 in the sector 22 as described above. The translucency values sensed from the specified pixels is then encoded along with time data and the resulting signals are recorded on the magnetic stripe 12 (FIG. 2) at sector 24. Thus, a card C is completed preparatory for use which involves repeated authentication at both on-line and off-line terminals.

In view of the above description, a complete understanding of the system will now flow from a consideration of the structure of the present invention for processing the cards C. Accordingly, reference will be made to FIG. 3.

The system involves three somewhat distinct forms of apparatus, specifically, terminals T, a communication channel H and a central station S. Initially consider the terminals T1-TN which are distributed for location at the facilities or control points where the cards C are presented for authentication. Normally, a total system would constitute a multiplicity of terminals T1-TN located over a substantial geographic area. Each of the terminals T1-TN is similar with the consequence that only the terminal T1 is illustrated in detail.

The location terminals T1-TN are coupled through a communication channel H to a central station S. The communication channel H may comprise telephone facilities with a dial-up capability whereby terminals T may be placed in communication with the central station S. The details of such a dial-up network system are very well known and accordingly are not treated herein.

The terminal T1 includes a card transport 30 (FIG. 3, upper left) for receiving a card C through an entry chute 32. The transport 30 comprises a mechanism for supporting the card C and moving it in relation to a magnetic stripe reader 34, a characteristic sensor 36 and a magnetic recorder 38. Normally, the transport and transducers would be produced as a somewhat integral unit; however, for purposes of explanation the reader 34, sensor 36 and recorder 38 are shown separately and indicated to be mechanically associated with the card transport 32 by dashed lines 40, 42 and 44.

The magnetic stripe reader 34 is connected to supply signals sensed from the stripe 12 of the card C to a decoder 46. A variety of structures may be employed as the decoder 46, which separately supplies three different signals. The signal NR (representative of the card account number) is sensed from the segment 20 of the stripe 12 and simply provided in that form to one output. However, the signals sensed from the segment 22 of the stripe 12 are encoded, combining the characteristic data A and the date information for regulating the use of the card C. Accordingly, the decoder 46 decodes the received signals and separates them into data reference signals RA (representative of the selected pixels in segment A) and time signals DA. Various well known forms of data decoders may be used to perform the function of decoding and segregating the signals RA and DA.

Recapitultting to some extent, the data reference signals RA represent the anticounterfeit data from the segments A of the area 14, FIG. 1. The time signals DA represent a date, prior to which the card C must be refreshed as explained below. The signals NR represent the card account number and are used as an address at the central station as described in detail below.

The signals NR and DA from the decoder 46 are supplied to actuate a gate circuit 48 controlled by a date tester unit 54 acting through a line 50. That is, the gate 48 is controlled by a binary signal received from the test unit 54 which functions to control an on-line operation. The line 50 is also connected to receive a signal from the central station S, also for commanding an on-line operation. Upon qualification of the gate 48, by the presence of a high signal in the line 50, the signals NR, DA and two additional signals are communicated to the central station S.

The signal DA from the decoder 46 is also applied to the date test unit 54. Essentially, the tester unit 54 incorporates a date clock and determines whether or not the signals DA manifest a date sufficiently recent for approval in an off-line mode. Time may be kept in a Julian format and the tester 54 simply checks to determine whether a maximum interval has passed since the last on-line verification of the card C. If the maximum interval has been exceeded, an on-line verification is commanded. The signal RA, from the decoder 46, is also applied to a correlator 56 in which the reference values of the signal RA are correlated with values freshly sensed from the card C. In that regard, the freshly sensed values are manifest by a signal SA which is received by the correlator 56.

To provide the signals SA and SB, the characteristic sensor 36 incorporates structure which may be as disclosed in the above-referenced U.S. Pat. No. 4,423,415. Specifically, the structure senses light emanating from the card C to manifest the opacity of the area 14 at specifically designated pixel locations within the segments A and B. Thus, translucency is measured at specific pixel locations. In accordance with the system of the referenced patent, the designated pixel locations are selected by the sensor 42 under control of location signals from the magstripe reader 34, (from segment 22 of the stripe 12, FIG. 2).

The signals SA manifest measurements taken within the segments A while the signals SB manifest measurements from the segments B. A sequence separator 58 segregates the two signals supplying the signals SA to the correlator 56 and the signals SB to the gate 48. Various well-known forms of signal separators may be employed to perform the function.

The correlator 56 provides an output signal indicative of the degree of correlation between the signals RA (reference measurements) and SA (freshly sensed measurements). Various forms of correlators may be employed for the correlator 56 to manifest the degree of coincidence or correlation between data represented by the signals RA and SA. In some situations a simple one-to-one correlation will be performed while in other situations more complex correlation techniques may be utilized and accordingly incorporated in the correlator 56.

In the disclosed embodiment, the output from the correlator 56 is a binary signal applied to the gate 48 and to a display unit 60. A high state of the approval signal indicates a favorable correlation and a low state indicates unfavorable results. If the display unit 60 is qualified by the date test unit 54, the results of the correlation are indicated by the display unit 60. Alternatively, an on-line authentication is commanded with the result that the display unit 60 is controlled by the central station S. That is, correlations from the correlator 56 control authentication during off-line operation while verification during on-line operations (including a correlation of the signals SB with a record from memory) are performed at the central station S. Thus, the display unit 60 is alternatively controlled by approval signals from either the correlator 56 or the correlator 72.

As indicated above, the communication channel H may take various forms, most typically as represented by a commercial telephone network. In that regard, while several distinct communication channels or lines are indicated through the communication channel H, it will be understood that in an actual installation these lines likely would be resolved into a single time-sharing channel. However, for purposes of explanation and illustration, a plurality of lines are convenient and helpful.

Data to and from the central station S is received at a central processor 70. A multiplicity of functions are performed by the central processor which may comprise a microcomputer or a minicomputer programmed to perform the operations as described below using techniques well known in the prior art. Specifically, the central processor 70 routes data, performs encoding operations, provides signals representative of the instant time, performs correlation functions and memory. Although such functions would normally all be performed within the processor 70, for convenience of illustration and explanation, a correlator 72 and a memory 74 are shown external to the central processor 70.

Figure 2:
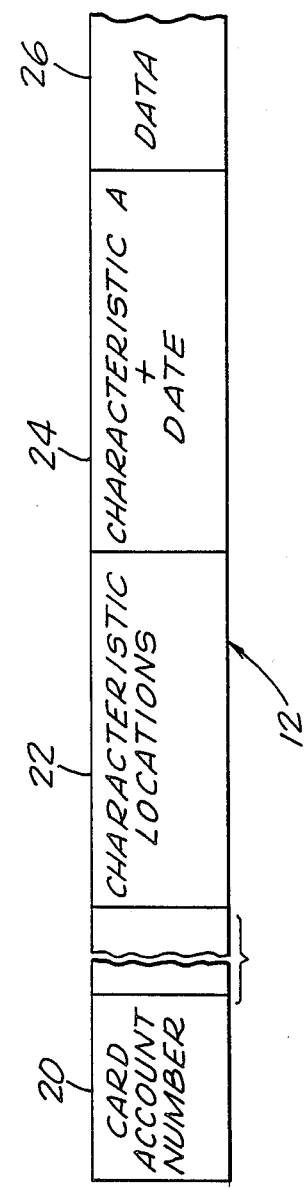
FIG. 2 is a graphic representation of data recorded on the card of FIG. 1.

In view of the above structural description of the system, an understanding of the operation may now best be accomplished by assuming the presentation of a card C (FIG. 1) bearing a magnetic stripe 12 recorded as described with respect to FIG. 2. Specifically, assume the presentation of such a card C to the system of FIG. 3 through the chute 32. Further assume that the card is initially presented for authentication off-line. That is, the terminal T1 is in one of several different configurations, as for example, the terminal T1 has no capability for on-line operation. As another possibility, the terminal T1 has the capability for on-line operation (as illustrated); however, for one reason or another it is disabled from such operation. In any event, the verification is to be off-line.

During the off-line authentication operation, the magnetic recorder 38 is inactive. However, the magnetic stripe reader 34 and the characteristic sensor 36 function to sense the stripe 12 (FIG. 1) and the area 14 respectively. As indicated above, data from the magnetic stripe includes date information and characteristic information for the segments A encoded together. The compound coded information is decoded to provide the separate time and characteristic data. The time or date information, in the form of signals DA, is applied to the date tester 54 for a determination as to whether or not the last off-line authentication was within the allowable period. Thus, the query is: "was the last on-line verification sufficiently recent"? Assuming approval in that regard, i.e. the last on-line approval was within the predetermined period, the tester 54 supplies a signal to qualify the display unit for the current verification.

Returning to the outputs from the decoder 46, the reference characteristic information, as manifest by the signal RA from the separator 58, is applied to the correlator 56. Thus, the correlator 56 has one operative input.

Somewhat concurrently with the above operations, the sensor 36 senses the area 14 (FIG. 1) to provide select analog representations of the segments A and B. As indicated above, the select pixels are designated by data from the magnetic stripe, specifically segment 22 (FIG. 2). Representative signals to command the selection are supplied from the reader 34 to the sensor 42.

The representations for pixels of segments A and B are processed in the separator 58 to provide distinct signals SA and SB, respectfully representative of select areas in the segments A and B. The signals SA are applied to the correlator 56 along with the reference signals RA for a determination of similarity. If the degree of similarity is determined to be sufficient, the correlator 56 provides an approval signal to actuate the display unit 60 indicating the authenticity of the card C. Conversely, if it is determined that the similarity does not meet a predetermined standard, the display unit 60 indicates disapproval. Of cours,, conditional or limited approvals may also be manifest in systems for certain applications.

In view of the above explanation of off-line authentication, it is to be appreciated that on-line authentication may be called into operation under any of several circumstances depending upon the nature of the installation. For example, on-line operation may be commanded by the central processor 70 and at some terminals on-line operation may be routine unless the central processor 70 is overburdened or is in a failed state. Control is provided by the gate 48.

In another situation, the gate 48 may be qualified if the date tester 54 determines that an excessive time has passed since the last on-line authentication of the card C. with qualification, the gate 48 supplied information signals through the communication channel H to the central processor 70. Specifically, the signals supplied are: signal NR (card account number), signal DA (date of last on-line authentication), signal SB (select characteristic information from segments B) and a signal indicating the correlation results provided from the correlator 56.

The group of signals supplied to the central processor 70 enables an on-line authentication which involves an additional correlation with respect to the area segments B. Specifically, the supplemental correlation is performed between the signals SB (sensed characteristic) and signals RB (referenced characteristic). The referenced characteristic signals RB are provided from the memory 74 and are addressed (directly or indirectly) by the card account number, i.e. signal NR. Accordingly, the second correlation is performed using reference data which is not available at the terminal T1. A higher standard of security is thus attained.

If the correlator 72 establishes a sufficient degree of similarity between the representations of the signals SB and RB, the central processor 70 is queued accordingly. Responding, the central processor 70 forms an approval signal and freshly encodes the characteristic data for segments B with the instant date. These signals are provided through the communication channel H to the location terminal T1. The approval signal actuates the display 60 to indicate an authentic card.

The freshly encoded characteristic-date data is applied to the magnetic recorder 38 and accordingly is recorded on the card C in the segment 24 (FIG. 2). That is, the segment 24 is recorded with fresh encoded data representative of the data A and the current time. Thus, the card is refreshed and accordingly may be approved for several off-line uses.

As indicated above, the system accommodates a number of different possible applications. For example, the central processor may employ supplemental data to determine approvals or may even code the card to indicate permanent disapproval. It is important to appreciate that the card C is void of reference data for confirming the characteristic of segments B in the area 14. Also, the locations of the select pixels employed in segments B of the area 14 (characteristic locations, segment 22, FIG. 2) may also be coded with the consequence that the information is more obscure Also note that although the segments A and B are illustrated to be interleaved in FIG. 1, any of a variety of formats could be employed to distinguish data segments A and B. For example, half the area 14 might be employed as area A while the other half is employed as area B.

Various formats also may be employed for determining the criteria for permitting off-line authentications in reference to on-line authentications. Merely as examples, off-line authentications may be allowed for a predetermined period of time, up to a predetermined value, or under certain circumstances as peak load periods.

As will be readily appreciated from the above-illustrative embodiment, the system hereof is susceptible to a great many other modifications and deviations within the basic conceptual framework. Accordingly, the scope hereof is deemed to be as set forth in the claims below.

What is claimed is:

1. A system for authenticating a device, as a credit card, alternately involving a location terminal alone and such a terminal in association with a central station, wherein said card includes a machine-readable uniqueness characteristic with first and second aspects and a memory means, said system comprising:

card sensing means at said location terminal to provide sensed signals representative of said first and second aspects of said uniqueness characteristic;

decoding means, for use in off-line and on-line authentication of said device, at said location terminal for decoding said memory to provide reference signals representative of said first aspect of said uniqueness characteristic;

correlator means at said location terminal for correlating said sensed signals representative of said first aspect with said reference signals representative of said first aspect to provide first approval signals;

means at said location terminal for completing a communication channel to said central station;

means, for use in on-line authentication of said device, at said central station for receiving said sensed signals representative of said second aspect of said uniqueness characteristic, correlating such signals to reference values and providing second approval signals; and means at said location terminal controlled by said first and second approval signals to manifest authenticity of said card.

2. A system according to claim 1 wherein said card sensing means comprises a light sensor for detecting light from said device.

3. A system according to claim 1 wherein said decoding means comprises a magnetic reader means for sensing said device.

4. A system according to claim 1 wherein said means at said location terminal for completing a communication channel includes means for testing time-related data from said device.

5. A system according to claim 1 wherein said means at said central station includes a memory means for storing reference values of said second aspect for a multitude of devices.

6. A system according to claim 1 further including a memory recorder at said local terminal for altering the contents of said memory means of said card.

7. A system according to claim 1 wherein said decoding means includes means for providing signals representative of time data relating to the on-line verification of said device.

8. A system according to claim 7 wherein said means for completing a communication channel to said central station is controlled by said signals representative of time data.

9. A system according to claim 8 wherein said means for completing a communication channel to said central station further includes means for testing said signals representative of time data with the instant time.

10. A system according to claim 1 wherein said decoding means at said location terminal further includes meansffor providing signals representative of an individual designation for said device.

11. A system according to claim 10 wherein said central station means includes means for providing reference values for said second aspect under control of said signals representative of said individual designation for said device.

* * * * *